(12) United States Patent
Schafer et al.

(10) Patent No.: US 6,715,508 B2
(45) Date of Patent: Apr. 6, 2004

(54) DRAINAGE TILE FLOW REGULATOR

(75) Inventors: Charlie J. Schafer, Panora, IA (US); Leo E. Beebout, Ankeny, IA (US); William Littler, IV, Adair, IA (US)

(73) Assignee: Agri Drain Corporation, Adair, IA (US)

(*) Notice: Subject to any disclaimer, the term of this patent is extended or adjusted under 35 U.S.C. 154(b) by 131 days.

(21) Appl. No.: 10/164,674

(22) Filed: Jun. 6, 2002

(65) Prior Publication Data

US 2003/0226599 A1 Dec. 11, 2003

(51) Int. Cl.[7] .............................. F16K 31/48; F16K 3/00
(52) U.S. Cl. ............................. 137/624.18; 137/624.11; 239/70
(58) Field of Search ...................... 137/624.11, 624.18; 239/70

(56) References Cited

U.S. PATENT DOCUMENTS

| | | | | |
|---|---|---|---|---|
| 3,747,620 A | * | 7/1973 | Kah, Jr. ................ | 137/624.18 |
| 5,868,164 A | * | 2/1999 | Haskett ................ | 137/624.11 |
| 6,145,755 A | * | 11/2000 | Feltz .................... | 137/624.11 |
| 6,484,800 B2 | * | 11/2002 | Carmody et al. ...... | 137/624.18 |

* cited by examiner

*Primary Examiner*—Kevin Lee
(74) *Attorney, Agent, or Firm*—Camille L. Urban; G. Brian Pingel

(57) ABSTRACT

The tile flow regulator disclosed is used for regulating the level of water in the fields of an agricultural operation according to seasonal needs by a mechanism for adjusting the outflow of water from the tile line. The regulator includes a housing through which water from the tile line is directed and in which a partition with at least one aperture is positioned. At least one vertically movable gate is associated each aperture and with a motor and gear assembly such that, upon actuation of the motor by a 12-month calendar, said gate(s) move to either open or close the aperture. If two apertures are included, the regulator can be fully open (both apertures open), fully closed (both apertures closed), or partially open (bottom aperture open, top one closed) to achieve the desired moisture level.

17 Claims, 5 Drawing Sheets

DRAINAGE TILE FLOW REGULATOR

BACKGROUND OF THE INVENTION

1. Field of the Invention

The present invention relates in general to regulating the level of water in the fields of an agricultural operation and, more particularly, to a system wherein the level of moisture in the soil above a buried tile line is regulated according to seasonal needs by a pre-set calendar and mechanism for regulating the outflow of water from the tile line.

2. Description of the Prior Art

It is known in the art to use a variety of machines and apparatuses to increase or decrease moisture in soil used for agrarian purposes. Some of these machines include the use of aquifers, irrigation ditches and canals, use of overhead sprinkler irrigation, terracing for directing the flow of water while maintaining top soil and some moisture in the soil on a hill, and the laying of underground tile lines into which water will drain and flow away from the field.

Tile lines, while effectively routing excess water from the soil have heretofore typically served that single purpose. Unfortunately, when moisture levels and the season result in a need for more water in the soil, the tile lines typically continue to drain without means to control or adjust the flow. In this manner, efficient water removal by tile lines can be detrimental to the crop either by depriving the plants of moisture or by allowing nitrates and other nutrients used by plants to flow out of the soil before use by plants or before sufficient time has passed to allow them to break down naturally.

The present invention takes the old art of using tile lines to drain excess water away from soil and provides for use of those tile lines in such a way as to manage the moisture level in the soil. The management is based on seasonal needs and is provided via automatic adjustments actuated according to a twelve month calendar.

It is therefore one object of the invention to keep moisture levels appropriate for root needs by raising or lowering the water table in the soil profile through the use of tile lines;

It is another object of the invention to provide a way to keep the water table high in the soil over the winter months so that nutrients and nitrates will not be lost but can break down naturally in the soil or be maintained until needed in the spring;

It is also an object of the invention to allow the water table to be dropped as low as possible prior to harvest to allow access to the field and to minimize compaction of the soil by large equipment and also prior to planting to allow the soil to warm and encourage deep root growth and, again, to allow access to the field.

SUMMARY

The tile line flow regulator of the present invention is typically installed near the outflow or end of a tile line or in a main collector line and is generally operable in one of two or three positions; partially open, fully open, or fully closed.

The preferred embodiment includes means for pre-setting the date at which the position will be changed, means to pre-select the desired position for that date, and a mechanism which comprises a gear system, at least one lever associated with at least one gate, a motor, a power source, and a partition with at least one opening positioned inside a housing. The location of the gate or gates relative to the opening(s) in the partition dictates the flow of water through the tile which, in turn, dictates the level of moisture in the subsoil above the tile line.

When used in a main collector line, more than one tile flow regulator is installed in spaced apart fashion along the line such that, in combination with the fall of the tile line, the water table can be managed relative to the fall.

One of the advantages of the present invention is that it provides for better, more efficient soil moisture management;

Another advantage is that the present invention provides more than either "open" or "closed" tile lines so the water level can be more responsive to seasonal needs;

Another advantage provided by the invention is that it provides a virtually hands-free operation triggered by date on a year round basis rather than relying on expensive water or moisture sensors;

Another advantage provided by the invention is that it provides a device which is versatile in that it can be tailored to effect different water table levels;

The present invention also provides the advantage of a single, mechanically simple arrangement to provide three possible positions for controlling water flow.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENT(S)

Figure 1:
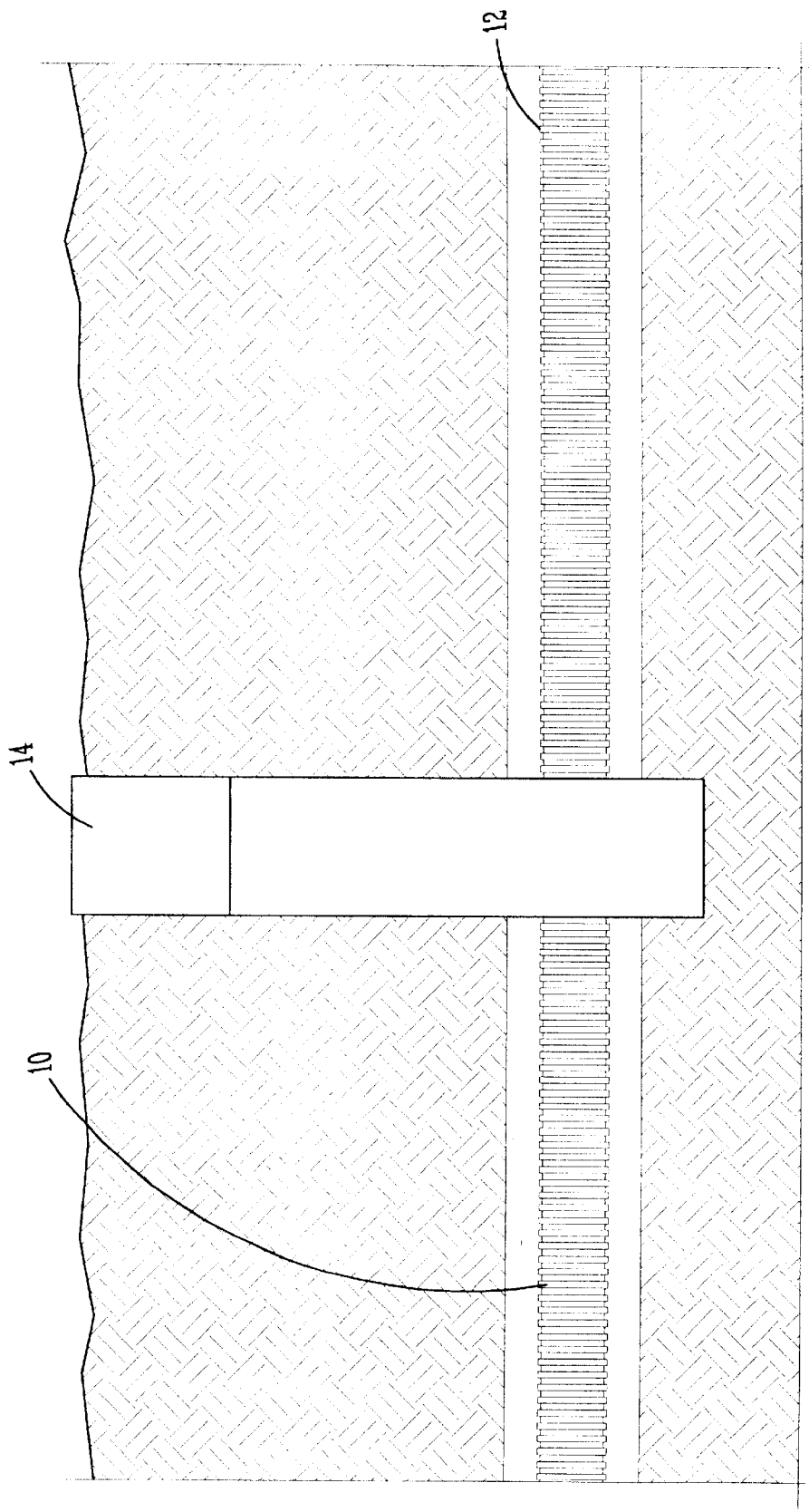
FIG. 1 is a cross section view of soil in a field showing a buried tile line, its outlet, and a preferred embodiment of the tile line flow regulator of the present invention.
Figure 2:
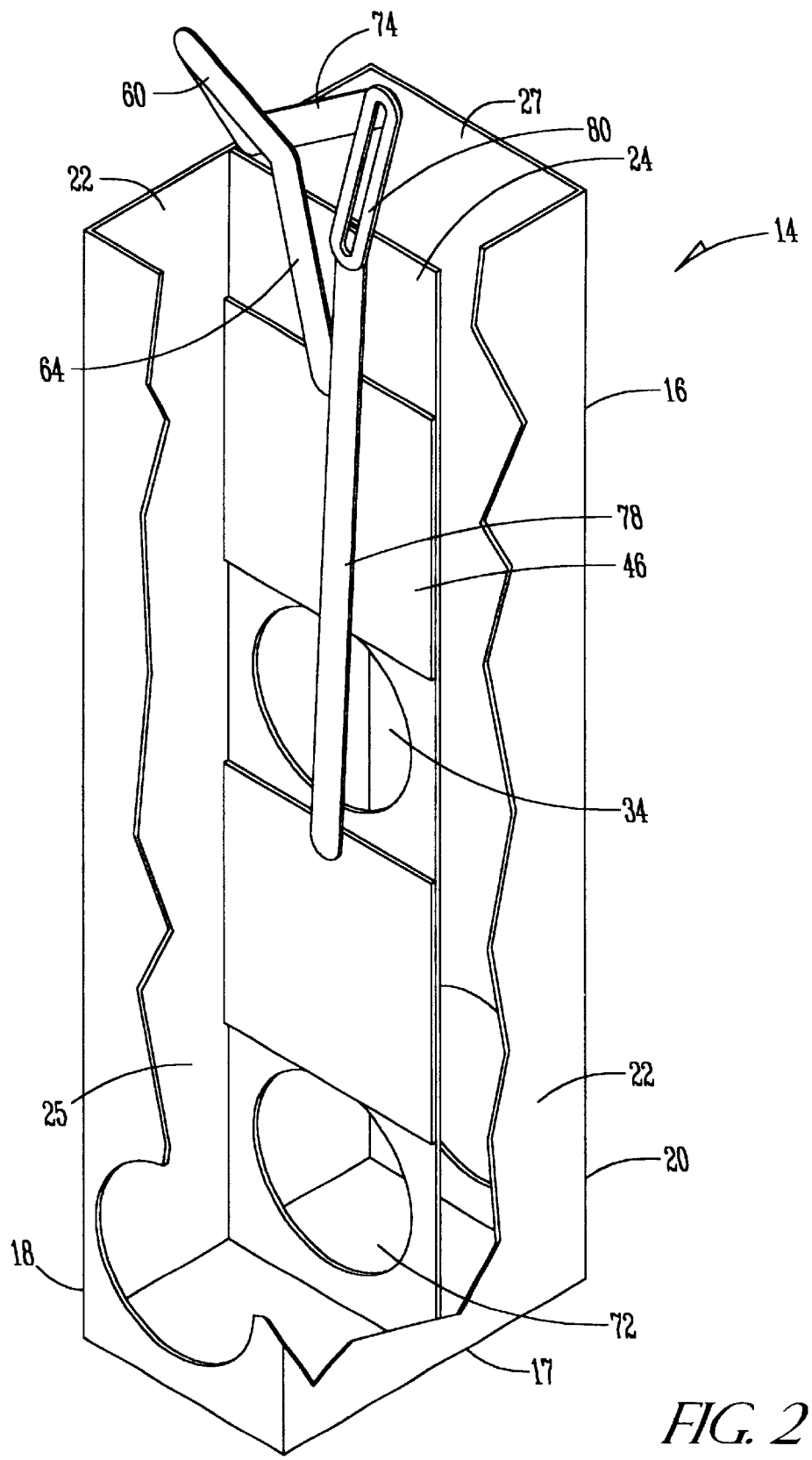
FIG. 2 is a perspective view of the present invention of FIG. 1.

As shown generally in FIG. 1, a tile line 10 is buried under soil in a field, with a general slope toward an outlet 12 and including a tile line flow regulator shown at 14. The flow regulator 14 comprises (as shown in FIG. 2) a housing 16. In one embodiment the housing 16 comprises a bottom 17, front panel 18, a back panel 20, and two side panels 22. However, the housing 16 can be of any shape such as cylindrical as long as a bottom 17 is present.

A partition 24 having a height 26 divides the housing 16 into a front portion 25 and a back portion 27. Two opposed and aligned openings, 30 and 32, are provided near the bottom 17 of the housing 16. The partition 24 comprises at least one aperture 34 not necessarily aligned with the outlet 12. The invention further comprises means 35 for securing the partition 24 in position between the front portion 25 and the back portion 27. Preferably, means 35 for securing the partition 24 is in the form of tracks mounted in the housing 16.

A timer 40, a power source 42, a flow adjustment assembly 44, a first vertically movable gate 46 and a motor 48 (not shown) are also enclosed in the housing 16 during normal use. In the preferred embodiment, a second vertically movable gate 50 is also enclosed in the housing 16. The gates 46 and 50 are each provided with means 51 for slidably associating the gate 46 or 50 with the partition 24. In the preferred embodiment, means 51 for slidably associating the gate 46 or 50 is in the form of "C" channels mounted on the partition 24.

Figure 3:
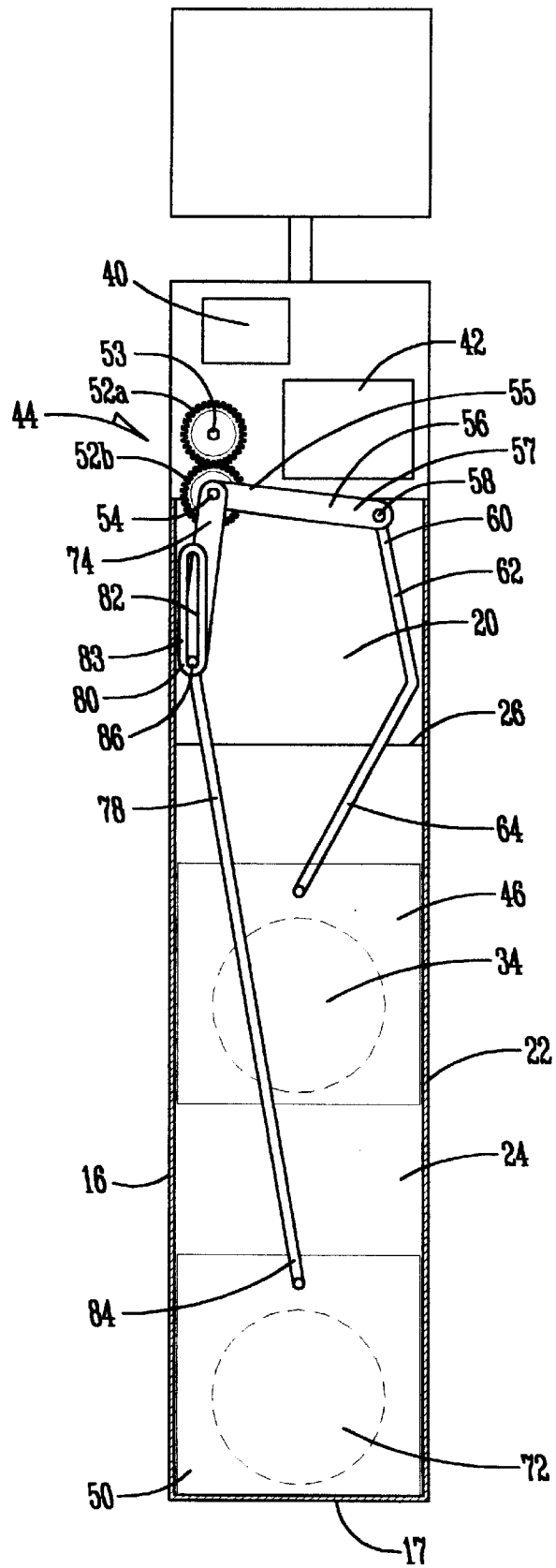
FIG. 3 is a front view of the present invention of FIG. 1, in a closed position, with a portion of the housing removed.
Figure 4:
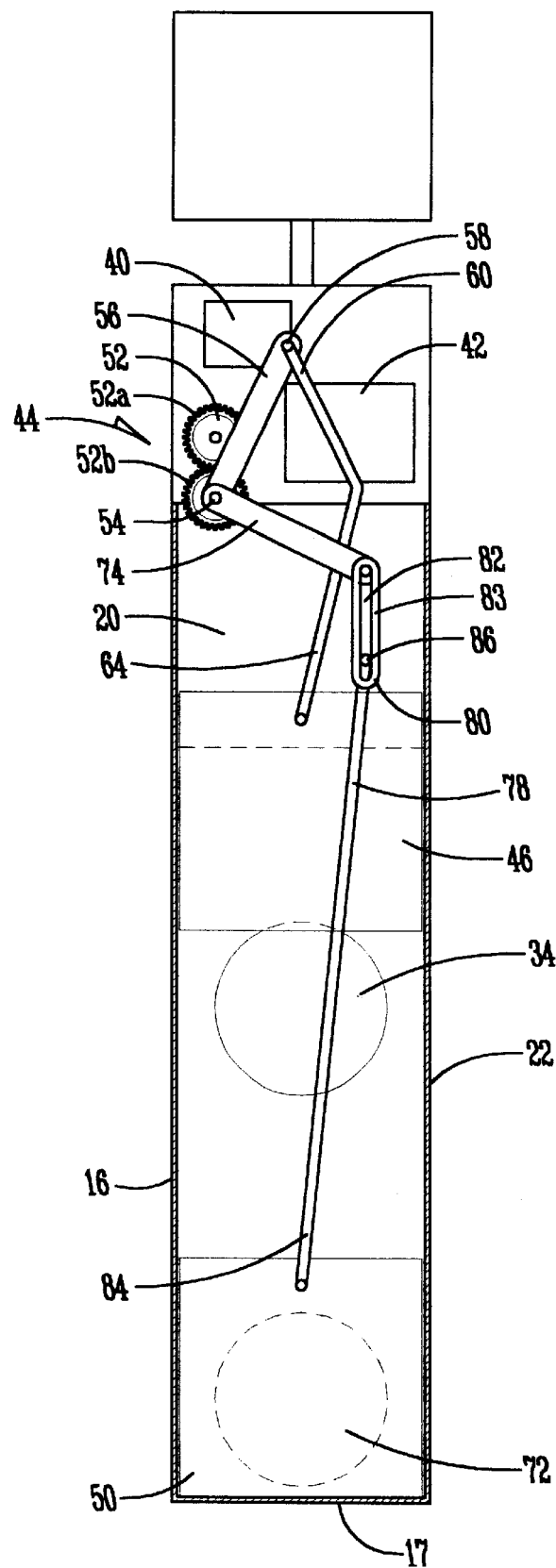
FIG. 4 is a front view of the present invention of FIG. 1 in a partially open position, with a portion of the housing removed.
Figure 5:
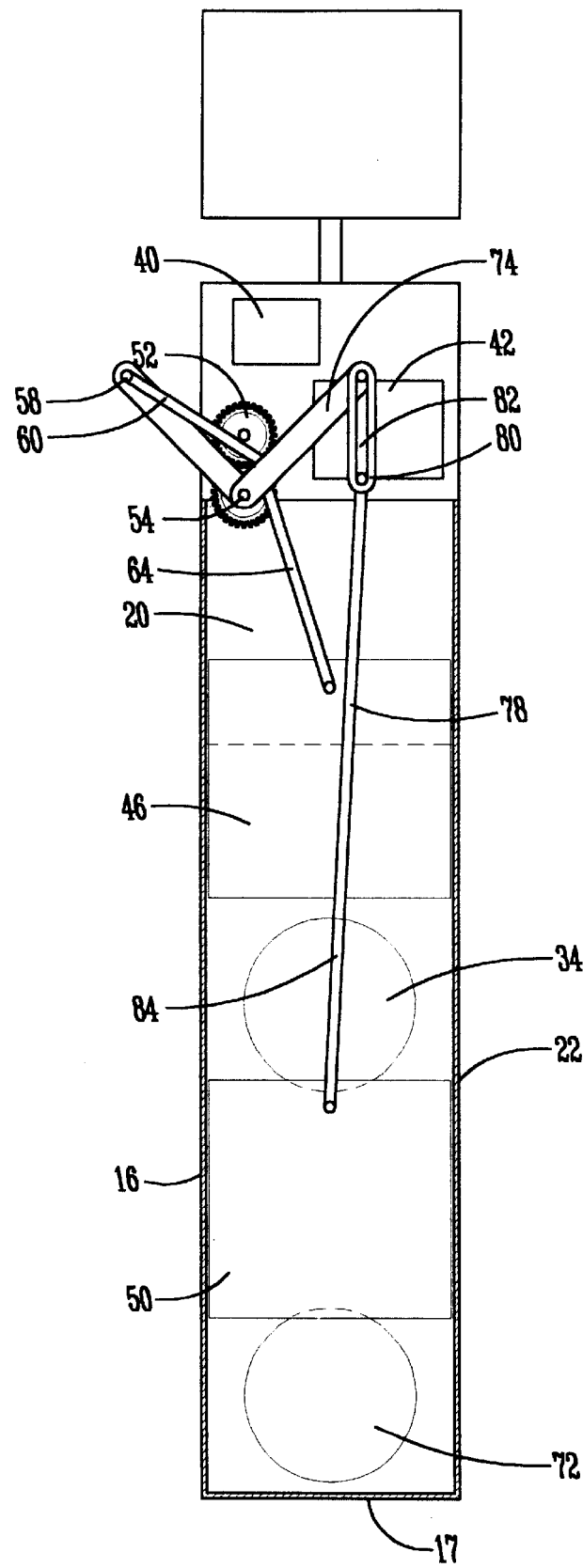
FIG. 5 is a front view of the present invention of FIG. 1 in a fully open position, with a portion of the housing removed.

FIGS. 3, 4, and 5 show the adjustment assembly 44 with a portion of the housing 16 removed. The adjustment assembly 44 comprises a gear means 52 associated via a drive shaft 53, with the motor 48 and formed of a first gear 52a and a second gear 52b in mechanical relationship with one another. The second gear 52b has an axle 54 on which one end 55 of a first lever 56 is fixed to associate the lever 56 with the gear means 52. The opposite end 57 of the lever 56 has a pivoted connection 58 for pivotally associating an upper end 60 of a bent rod 62 with the lever 56. A lower end 64 of the bent rod 62 is pivotally connected with the first vertically movable gate 46 which, in closed position, is aligned with the at least one aperture 34 in the partition 24. Upon actuation of the motor 48 the gear means 52 rotates. Rotation of the gear means 52 moves the first lever 56 counterclockwise through an angle which, due to its pivotal association 58 with the first end 60 of the bent rod 62 translates into upward vertical movement of the bent rod 62. Such movement of the bent rod 62 and means 51 for slidably associating the gate 46 with the partition 24 act together to raise the first gate 46 to open the at least one aperture 34. When only one gate is contemplated, the position when the first 46 gate is raised would be the "fully open" position and would allow flow of water through the tile line 10 at a level approximately the same as the outlet 12. The position when the first gate is lowered would be "fully closed" and the water level would have to rise above the height 26 of the partition 24. In the "fully closed" position, the flow regulator 14 is designed to establish the water level in the soil at its highest.

In the preferred embodiment, the flow regulator 14 includes the second gate 50 and a second aperture 72 formed in the partition 24 spaced apart from and below the aperture 34. In this arrangement, the adjustment assembly 44 further comprises a second lever 74 with one end 75 fixed on the axle 54 to associate the second lever 74 with said gear means 52. The second lever 74 and the first lever 56 are in a fixed relationship of about 90 degrees apart from one another and with the gear means 52. A link arm 78 comprising a top portion 80 with a lost motion slot means 82 for pivotally and slidably associating the top portion 80 with a pin 86 located on an opposite end 83 of the second lever 74. The link arm 78 also has a relatively long straight bottom portion 84 that is somewhat angled from the top portion 80. The bottom portion 84 is pivotally attached to said second gate 50 which is aligned with the second aperture 72 in the partition. Preferably, the second aperture 72 is vertically spaced below the aperture 34 so as to be positioned near the bottom of the partition 26.

The flow regulator 14 has at least three flow positions, "fully closed", "partially open", and "fully open" contemplated by the preferred embodiment and are best shown in FIGS. 3–5. When both the gates 46 and 50 are aligned with their respective apertures 34 and 72 the flow regulator 14 is said to be in a "fully closed" position (See FIG. 3). The "fully closed" position means the water level is adjusted to its highest level which is equal to the height 26 of the partition 24 and water flows over the height of the partition and through the opening 30 in the front panel 18.

Upon rotation of the gear means 52 described above wherein the first gate 46 is raised, the second lever 74 is also rotated about the gear means 52. However, the slot means 82 for pivotally and slidably associating the second lever 74 with the straight rod 78 acts such that the pin 86 of the second lever 74 slides within the slot means 82 in the top portion 80 of the link arm 78 as the arm 78 pivots as the second lever 74 is first rotated. Due to the lost motion connection between the lever 74 and the link arm 78, the arm 78 is not displaced vertically thereby leaving the second gate 50 in a closed position. Therefore, the flow regulator 14 is "partially open" with the first gate 46 open and the second gate 70 closed and the regulator 14 operates to lower the level of the flow of water relative to the "fully closed position" (See FIG. 4).

Upon further rotation of the gear means 52, the first lever 56 is rotated through a mostly horizontal position and the bent rod 62 pivots such that the first gate 46 remains in the open position. However, during this angle of rotation, the second lever 74 is moved through a vertical distance. Such movement of the second lever 74 and means 51 for slidably associating the gate 50 with the partition 24 act together to raise the second gate 50 to an open position (See FIG. 5). When both the gates 46 and 50 are open, the flow regulator is said to be "fully open" and the level of water relative to the "partially open" position is lowered thereby lowering the level of moisture in the soil.

When the motor (not shown) is actuated it rotates the gear means 52 a partial turn each time it is actuated. In the preferred embodiment, starting with the first 46 and second 50 gates closed ("fully closed" position), the gear means 52 is rotated ¼ turn which results in raising the first gate 46 and leaving the second gate 50 in a closed position, which creates the "partially closed" position. A second ¼ turn results in raising the second gate 50 and leaving the first gate 46 in its open position, which creates the "fully open" position.

In another embodiment, the partition 24 is divided into an upper portion 86 and a lower portion 88. The lower portion 88 contains aperture 72 and the upper portion 86 contains aperture 34. In this embodiment, the spaced apart relationship of apertures 72 and 34 can be adjusted by inserting a plurality of spacers 90 between the upper portion 86 and the lower portion 88 or the partition 24. Means 35 for securing the upper portion 86 and lower portion 88 between the front portion 25 and the back portion 27 of the housing 16 comprise tracks into which the upper portion 86, the lower portion 88, and the desired number of the plurality of spacers 90 fits. In this manner the height 26 of partition 24 can also be adjusted as can the spaced apart relationship of the apertures 72 and 34.

The timer 40 may be set for a predetermined time and is electrically associated with the motor. In the preferred embodiment, the timer 40 is an electronic 12-month calendar and a predetermined date is typically set to reflect seasonal needs. These seasonal needs will vary by crop and geography but such needs can easily be accommodated by the use of multiple predetermined dates. For example, in winter (for some crops) the invention is left in the "fully closed" position to keep valuable chemical applications from being washed away too soon. In the spring, for example on March 1, the motor 48 is actuated and the gear means 52 moves ¼ turn to open the first gate 46 and leave the second 50 closed in the "partially closed" position. And so on.

Although any kind of long lasting battery may be used to provide a power source 42, the preferred embodiment employs a solar panel which transfers power to a solar battery which stores the charge to be used by the timer 40 and the motor 48. Finally, as an added and useful feature, the preferred embodiment may include a flag which is positioned by movement of the gear assembly in such a way that a farmer can simply view the flag from a distance to confirm that the invention is working properly.

Thus, the present invention has been described in an illustrative manner. It is to be understood that the terminology that has been used is intended to be in the nature of words of description rather than of limitation.

Many modifications and variations of the present invention are possible in light of the above teachings. For example, said partition could be bolted or welded in between said back panel and said front panel of said housing. Therefore, within the scope of the appended claims, the present invention may be practiced otherwise than as specifically described.

What I claim is:

1. A drainage tile line flow regulator comprising:
   (a) a housing having a bottom and two opposed and aligned openings to allow water to enter and exit said housing;
   (b) a motor associated with said housing;
   (c) a power source for supplying power to said motor;
   (d) a timer for controlling the operation of said motor;
   (e) a partition dividing said housing into a front portion and a back portion and having at least one aperture to permit water to flow from the housing front portion to said back portion and means for securing said partition in position between said front portion and said back portion; and
   (f) a flow adjustment assembly comprising a gear means that is driven by said motor during its operation which is controlled by said timer, a first lever associated with said gear means, a first vertically movable gate associated with said first lever, and means for slidably associating said gate with said partition such that upon the operation of said motor, said first gate moves relative to said at least one aperture in said partition such that said at least one aperture can be opened or closed.

2. A drainage tile flow regulator as claimed in claim 1 wherein said adjustment assembly further comprises:
   a) a second aperture in said partition vertically spaced apart from said at least one aperture;
   b) a second lever associated with said gear means; and
   c) a second vertically movable gate associated with said second lever and means for slidably associating said second gate with said partition such that upon the operation of said motor, said second gate moves relative to said second aperture in said partition such that said second aperture can be opened or closed upon the operation of said motor.

3. A drainage tile flow regulator as claimed in claim 1 wherein said partition comprises an upper portion having an aperture, a lower portion having an aperture, a plurality of spacers for adjusting space between said apertures, and means for securing said partition in position comprises tracks mounted in said housing into which said upper portion, said lower portion, and said plurality of spacers slide.

4. A drainage tile flow regulator as claimed in claim 1 wherein said timer is an electronic 12-month calendar which can be set to operate said motor on a pre-selected date.

5. A drainage tile flow regulator as claimed in claim 1 wherein said power source comprises a solar panel for gathering solar power associated with a battery for storing said power.

6. A drainage tile flow regulator as claimed in claim 2 wherein said gear means is associated with a drive shaft of said motor and comprises a first gear in mechanical relationship with a second gear which includes an axle associated with said first lever and said second lever in spaced apart relationship such that as said gear means rotates and said first and second levers are moved with said rotation, they remain spaced apart.

7. A drainage tile flow regulator as claimed in claim 2 wherein said two opposed and aligned openings in said housing are placed near said bottom of said housing.

8. A drainage tile flow regulator as claimed in claim 2 wherein said flow adjustment assembly further comprises three flow positions wherein a first position is fully closed if said first gate and said second gate close said at least one aperture and said second aperture forcing water to flow over said partition; a second position is partially open when said first gate is moved relative to said at least one aperture such that it is open and said second gate is in position to close said second aperture forcing water to flow through said at least one aperture; and a third position is fully open when said first gate and said second gate open said at least one aperture and said second aperture allowing water to flow through each.

9. A drainage tile line flow regulator as claimed in claim 2 wherein said first vertically movable gate is associated with said first lever by a bent rod which has an upper end pivotally connected with said first lever and a lower end pivotally connected with said first vertically movable gate and said second vertically movable gate is associated with said second lever by a link arm with a top portion, a pin, and a lost motion slot means for pivotally and slidably associating said top portion with said pin and said second lever, and a long straight bottom portion pivotally attached to said second gate.

10. A drainage tile line flow regulator as claimed in claim 2 wherein said means for securing said partition between said front portion and said back portion comprises tracks affixed to said housing into which said partition slidably fits.

11. A drainage tile line flow regulator comprising:
   (a) a housing having at least two opposed and aligned openings to allow water to enter and exit said housing;
   (b) a motor associated with said housing;
   (c) a power source for supplying power to said motor;
   (d) a timer for controlling the operation of said motor;
   (e) a partition dividing said housing into a front portion and a back portion and having vertically spaced first and second apertures to permit water to flow from the housing said front portion to said back portion and means for securing said partition in position between said front portion and said back portion; and
   (f) a flow adjustment assembly comprising a gear means associated with a drive shaft and said motor and formed of a first gear in mechanical relationship with a second gear with an axle, a first lever with one end associated with said gear means and an opposite end pivotally associated with an upper end of a bent rod, and a first vertically movable gate pivotally connected with a lower end of said bent rod and means for slidably associating said gate with said partition and movable relative to said first aperture in said partition upon the actuation of said motor, a second lever with one end fixedly associated with said axle and an opposite end associated with a pin, a link arm comprising a top portion with a lost motion slot means for pivotally and slidably associating said pin on said second lever, a straight bottom portion pivotally attached to a second vertically movable gate, means for slidably associating said gate with said partition, said gate being therefore movable relative to said second aperture in said partition upon the operation of said motor.

12. A drainage tile line flow regulator as claimed in claim 11 wherein said timer is a 12-month calendar and dates can be selected at which said timer will actuate said motor.

13. A drainage tile line flow regulator as claimed in claim 12 wherein said power source comprises a solar panel for gathering solar power and a battery for storing said power.

14. A drainage tile line flow regulator as claimed in claim 11 wherein said means for pivotally associating said opposite end of said first lever with a bent rod comprises a nut and bolt assembly.

15. A drainage tile line flow regulator as claimed in claim 11 wherein said means for securing said partition in position between said front portion and said back portion of said housing comprises a channel mounted in said housing into which said partition is fitted and means for slidably associating said first vertically movable gate and said second vertically movable gate with said partition comprising at least one set of tracks mounted on said partition and spaced so as to slidably accommodate said first and second gates.

16. A drainage tile line flow regulator comprising
   (a) a housing having a bottom, and two opposed and aligned openings to allow water to enter and exit said housing;
   (b) a motor associated with said housing;
   (c) a power source for supplying power to said motor comprising a solar panel for gathering solar power and a solar battery for storing said power;
   (d) a timer for controlling the operation of said motor comprising a 12-month calendar wherein a date may be pre-selected at which said timer will actuate said motor;
   (e) a partition dividing said housing into a front portion and a back portion and having a height and a first aperture and a second aperture vertically spaced from one another to permit water to flow from the housing front portion to said back portion and means for securing said partition in position between said front portion and said back portion; and
   (f) a flow adjustment assembly for controlling flow through said first and second apertures said assembly further comprising:
      1. a gear means that is driven by said motor during its operation which is controlled by said timer said gear means formed of a first gear in mechanical relationship with a second gear which has an axle;
      2. a first lever with one end fixedly associated with said axle and an opposite end pivotally associated with an upper end of a bent rod;
      3. a first vertically movable gate associated with a lower end of said bent rod and means for slidably associating said gate with said partition said gate being therefore movable relative to said first aperture in said partition upon the operation of said motor such that said first aperture can be opened or closed;
      4. a second lever with one end fixedly associated with said axle and an opposite end with a pin;
      5. a link arm comprising a top portion with a lost motion slot means for pivotally and slidably associating said top portion with said pin on said opposite end of said second lever, and a straight bottom portion somewhat angled from said top portion;
      6. a second vertically movable gate pivotally associated with said bottom portion of said link arm and means for slidably associating said second gate with said partition, said second gate being therefore movable relative to said second aperture in said partition upon the operation of said motor such that said second aperture can be opened or closed;
      7. said first end of said first lever and said first end of said second lever fixedly associated with said gear means in a spaced apart relationship such that upon rotation of said gear means, said first lever and said second lever also rotate but remain in said spaced apart relationship;
      8. said means for slidably associating said first gate with said partition and said manes for slidably associating said second gate with said partition each comprise a set of tracks mounted on said partition; and
   (g) three flow positions wherein:
      1. fully closed comprises said first aperture and said second aperture closed by said first gate and said second gate respectively such that flow is directed over said height of said partition;
      2. partially open comprises said first aperture opened by said first gate and said second aperture closed by said second gate whereby flow is directed only through said first aperture; and
      3. fully open comprises said first aperture opened by said first gate and said second aperture opened by said second gate whereby flow is directed through said first and said second apertures.

17. A tile flow regulator as claimed in claim 16 wherein said partition comprises an upper portion containing said first aperture, a lower portion containing said second aperture, and a plurality of spacers for adjusting the vertical spacing between said first and second apertures and the height of said partition, and means for securing said partition in position comprising tracks mounted in said housing into which said upper portion, said lower portion, and said plurality of spacers are slidably received.

* * * * *